Patented June 23, 1953

2,643,256

UNITED STATES PATENT OFFICE 2,643,256

PREPARATION OF 2-AMINOPYRIDINE AND 2-AMINOQUINOLINE

Nat H. Marsh, Noroton Heights, Conn., assignor to American Cyanamid Company, New York, N. Y., a corporation of Maine No Drawing. Application January 28, 1950,
Serial No. 141,155

4 Claims. (Cl. 260—288)

The present invention relates to a novel method of preparing 2-aminopyridine and 2-aminoquinoline.

More specifically, the invention contemplates the preparation of the two above-named compounds by heating pyridine or quinoline under superatmospheric pressure with ammonia in the presence of a Raney catalyst, such as Raney nickel, Raney cobalt, or the like.

It is an object of the invention to prepare 2-aminopyridine and 2-aminoquinoline much more cheaply than by comparable methods of the prior art.

The commercial method for the preparation of 2-aminopyridine is to react pyridine with sodamide, whereby sodium adds at the pyridine nitrogen and the amino group adds at the number two carbon of the pyridine ring, followed by hydrolysis to split off sodium hydride, leaving 2-aminopyridine. This process is open to objection that sodamide is not a commercial compound, but must be prepared on the spot by reacting sodium metal and ammonia. The reaction thus involves several steps and the use of materials that are hazardous and difficult to handle. By contrast, the process of the present invention may be carried out in one step in an autoclave, followed by fractional distillation to separate the 2-aminopyridine.

It has been the impression of those skilled in the art that catalytic methods were unsatisfactory for the preparation of 2-aminopyridine and the like. For example, according to Wibaut et al., Rec. Trav. Chim., 48, p. 1008, if 168 g. of pyridine is heated in an autoclave at a temperature of 470° C., in the presence of ammonia, with a catalyst consisting of finely-divided nickel on asbestos, the yield of 2-aminopyridine is only 0.35 g. By the process of the present invention, a yield is obtained that is more than twenty times as great, simply by substituting a Raney catalyst, such as Raney nickel or Raney cobalt or the like, for the nickel-on-asbestos catalyst used by Wibaut.

The following examples illustrate without limiting the invention.

Example 1

Into a 300 cc. autoclave containing 10 g. of Raney nickel (which had been dried by heating for two hours at 300° C. in an inert atmosphere, such as hydrogen), there was charged 17.9 g. of pyridine and 50 g. of ammonia. The autoclave was then sealed and heated at 350° C. for 17 hours, during which time the pressure was about 5600 p. s. i. At the end of this time, the autoclave was cooled to room temperature and excess gases vented to the atmosphere. The reaction mass was washed from the autoclave with an inert solvent such as benzene, and the thus-formed solution was charged to a fractionating column. Fractions consisting of the wash solvent (benzene), unreacted pyridine, and 2-aminopyridine were taken overhead. Of the pyridine charged to the reactor, 21% was converted to 2-aminopyridine, and 72% was recovered unchanged.

Example 2

Using the procedure of Example 1, 10 g. of Raney nickel, 32.9 g. of quinoline, and 50 g. of ammonia were charged to a 300 cc. autoclave, which was then heated to 350° C. for 17 hours. The autoclave pressure during the reaction was about 4600 p. s. i. After venting, as in Example 1, the autoclave product was dissolved in an inert solvent, in this case ethanol. The ethanolic solution was evaporated to give a dark, oily residue, which was extracted with petroleum ether to remove unreacted quinoline and to precipitate crude 2-aminoquinoline as a light brown solid. Recrystallization of the light brown solid twice from water in the presence of decolorizing charcoal gave white crystalline 2-aminoquinoline. By this method, conversions up to 15% or higher per pass may be obtained.

Although in the two examples above the temperature of 350° C. was used, this is not critical and may vary widely. The preferred range is 300° to 400° C. Some product will be obtained, however, at temperatures as low as 200° C. and as high as 490° C.

The proportions of reactants are not critical and may vary widely, while still giving the desired product. The time of reaction can also be varied widely.

While the invention has been described with particular reference to specific embodiments, it is to be understood that it is not to be limited thereto but is to be construed broadly and restricted solely by the scope of the appended claims.

I claim:

1. The process for aminating a member of the group consisting of pyridine and quinoline that comprises heating said member with ammonia in the presence of a Raney catalyst at a temperature within the approximate range of 200° to 490° C. and recovering the thus-aminated compound.

2. The method of preparing 2-aminopyridine that comprises heating pyridine and ammonia at a temperature within the approximate range 300° to 400° C. in a closed reaction zone under the autogenously developed pressure in the presence of a Raney nickel catalyst, and recovering 2-aminopyridine from the thus-formed reaction mass.

3. The method of preparing 2-aminoquinoline that comprises heating quinoline and ammonia at a temperature within the approximate range 300° to 400° C. in a closed reaction zone under the autogenously developed pressure in the presence of a Raney nickel catalyst, and recovering 2-aminoquinoline from the thus-formed reaction mass.

4. The process for aminating a member of the group consisting of pyridine and quinoline that comprises heating said member with ammonia in the presence of a Raney catalyst of the group consisting of Raney nickel and Raney cobalt at a temperature within the approximate range of 200° to 490° C. and recovering the thus-aminated compound.

NAT H. MARSH.

References Cited in the file of this patent

Wibaut et al., Rec. Trav. Chim., vol. 48, pp. 1005–1009 (1949).